(12) United States Patent
Durrieu et al.

(10) Patent No.: US 6,634,442 B1
(45) Date of Patent: Oct. 21, 2003

(54) PROCESS FOR USING BIODEGRADABLE DRILLING MUDS

(75) Inventors: Josiane Durrieu, Pau (FR); Christian Zurdo, Pau (FR); Alain Rabion, Pau (FR); Laurent Fraisse, Saint Faust (FR); Michel Guillerme, Serrescastet (FR)

(73) Assignee: Elf Exploration Production, Courbevoie (FR)

( * ) Notice: Subject to any disclaimer, the term of this patent is extended or adjusted under 35 U.S.C. 154(b) by 0 days.

(21) Appl. No.: 09/744,284

(22) PCT Filed: Jul. 20, 1999

(86) PCT No.: PCT/FR99/01773

§ 371 (c)(1),
(2), (4) Date: May 7, 2001

(87) PCT Pub. No.: WO00/05324

PCT Pub. Date: Feb. 3, 2000

(30) Foreign Application Priority Data

Jul. 21, 1998 (FR) ............................................. 9809263

(51) Int. Cl.$^7$ ............................................. E10K 7/00
(52) U.S. Cl. ......................................... 175/70; 507/138
(58) Field of Search ................................. 507/131, 133, 507/138; 175/65, 70

(56) References Cited

U.S. PATENT DOCUMENTS

| 4,631,136 A |   | 12/1986 | Jones |
| 5,707,940 A | * | 1/1998  | Bush et al. .................. 507/134 |
| 5,755,295 A | * | 5/1998  | Hayatdavoudi et al. ....... 175/65 |
| 5,807,811 A | * | 9/1998  | Malchow, Jr. .............. 507/128 |

FOREIGN PATENT DOCUMENTS

| EP | 0 374 671    | 6/1990  |
| EP | 0 386 636    | 9/1990  |
| WO | WO 95 21225  | 8/1995  |
| WO | WO 95 26386  | 10/1995 |
| WO | WO 98 50484  | 11/1998 |

\* cited by examiner

*Primary Examiner*—Thomas B. Will
*Assistant Examiner*—Jennifer R. Dougherty
(74) *Attorney, Agent, or Firm*—Kenyon & Kenyon

(57) ABSTRACT

Process for using biodegradable drilling muds, characterized in that a able surface sludge which is stable up to about 100° C., with an adjustable filtrate-reducing power of from 2 to 13 cm$^3$ depending on the amount of filtrate-reducing agent used, and with an electrical stability of greater than or equal to 1000 volts, is introduced into the well at the start of drilling, and in that, when the temperature of the terrain passed through reaches 100° C., the surface sludge is replaced with a bottom sludge which is stable at a temperature above 200° C., the volume of the surface sludge representing from 60 to 80% by volume relative to the total volume of sludge used.

31 Claims, No Drawings

PROCESS FOR USING BIODEGRADABLE DRILLING MUDS

The present invention relates to a process for using biodegradable muds during the drilling of a well. The invention relates more particularly to a process for using several types of mud throughout the length of the well.

It is common practice to use a single drilling mud throughout the depth of the well, the specific properties of this mud being linked to the drilling temperature at the bottom of the well and the necessary ability of the mud to cool down, to lubricate, to plug the wall of the terrains passed through and to bring the cuttings up to the surface.

In order to reach terrains in which the temperatures at the bottom of the well reach 200° C. and above, drilling muds must keep their physical properties intact, i.e. their capacity for lubrication, their resistance to oxidation, their carrying power for bringing the cuttings up to the surface, their density and their activity as filtrate-reducing agents. These muds must also contain sufficient basic reserves to neutralize the acidic species encountered during the drilling and generally found in deep layers, such as carbon dioxide or hydrogen sulphide. When terrains are reached containing these acidic species and reaching temperatures above about 100° C., 70% of the volume of the mud required for the drilling has been used, since the deeper the drilling proceeds into the ground, the more the diameter of the well reduces. This results in about 70% by volume of poorly-employed mud, since in this first part of the well corresponding to the so-called surface drilling, the properties required may be less specialized than those required at the bottom of the well. In particular, since the drilling temperatures are low (below 100° C.), the drilling fluid undergoes little transformation such as oxidation, hydrolysis or even decomposition.

It is thus a case of adapting the mud to the terrain passed through, which has a direct impact on the technical, physical and chemical properties of the muds selected, and on the order in which they are used, the consequence being economical, since the purchasing cost of the drilling muds may be reduced.

To add to this first problem are the problems of treating the cuttings at the surface, recovery of the mud by screening in order to recycle it, and storage of the cuttings. These problems, which are already difficult on land, become much more difficult in the case of offshore platforms, since the constraints with regard to environmental regulation are much stricter. Economically, it is more reasonable to dump these cuttings at sea rather than to transport them onshore for treatment, all the more since the volumes of cuttings are much greater, from 60 to 80% of the total volume of the cuttings dumped from the well, in the case of surface drilling. Dumping the cuttings at sea can thus depend on more than just the toxicity of the mud used or its biodegradability in the marine environment.

Among the muds currently used are water-based muds, oil-based muds and so-called replacement muds.

Oil-based muds comprise an oil base formed of crude petroleum or a hydrocarbon-based fraction, to which are added a certain number of additives for improving their rheological properties, their filtrate-reducing power and their basicity. Mention may be made of oils of "diesel" type or mineral oils with a low content of aromatic compounds.

Thus, U.S. Pat. No. 4,481,121 proposes oil-based muds containing from 75 to 95% by volume of gas oil or of a plant oil, in particular extract of pine resin or "tall oil", paraffins with a melting point of between 76 and 120° C. and from 5 to 25% by volume of a basic reserve consisting of diethanolamide and alkaline hydroxides.

However, such muds are highly toxic to the environment and biodegrade very slowly in aerobic and anaerobic media. Such pollution can pose a major problem if it is necessary to drill through a water table. Certain national legislations have already banned the use of these muds or the offshore dumping of drilling cuttings impregnated therewith.

Water-based muds using aqueous compositions obtained from polymers, polyols or polyglycerol, although being less polluting and biodegradable, are little used on account of their poor stability above 100° C., their insufficient lubricant properties in deflected wells and the presence of water in clay-based terrains.

Replacement muds are used especially as a replacement for oil-based muds, which are often highly aromatic. They are formulated from non-toxic and non-aromatic hydrocarbon-based synthetic products.

A first type of replacement mud is obtained from linear or branched olefins, or, from poly($\alpha$-olefins) whose performance characteristics are similar to those of oil-based muds, i.e. maintenance of the lubricant and rheological properties at high temperature, maintenance of good resistance to oxidation and maintenance of their non-toxic nature. They biodegrade slowly in aerobic medium and are relatively non-biodegradable in anaerobic medium (J. Steber et al., Offshore, September 1994). This problem is all the more critical when drillings are carried out at sea, in which it is common practice to dump the mud-impregnated cuttings. Piles of cuttings accumulate under the water, close to the platform, and an accumulation of non-biodegradable chemical compounds is observed in these piles. Inside these piles, since the medium is anaerobic, there is no possible biodegradation of these compounds, while at the surface of the piles, the medium being aerobic, there is slow degradation of these compounds. It is for this reason that certain legislations make provision to greatly limit or even ban the offshore dumping of these cuttings since they are relatively non-biodegradable.

The muds currently preferred consist of readily-biodegradable hydrocarbon-based products, among which are the synthetic esters as described in U.S. Pat. Nos. 4,374,737 and 5,232,910. These highly complicated muds are expensive since they have been designed to satisfy all drilling conditions, including drilling under extreme conditions such as withstanding a temperature above 200° C., oxidation and acidic media.

Alongside these muds are reverse emulsions, which are less polluting since they are considered as being readily biodegradable, such as those described in PCT patent application WO 95/GB95/00680. These reverse emulsions consist of refined plant oils of high viscosity mixed with appropriate diluents to lower their viscosity. These muds based on reverse emulsions can be used irrespective of the temperature throughout the depth of the well. They are less toxic and more biodegradable than the previous muds, but have a very high cost price since they are fully refined and mixed with a diluent which is often expensive and various additives, in particular antioxidants, which are essential for correct behaviour of the emulsion at high drilling temperatures.

The aim of the present invention is to reduce the risks of pollution while at the same time substantially reducing the cost prices of the drilling operation as regards the total cost of the mud used. The invention is also directed towards reducing, or even eliminating, the cost of treating impregnated cuttings, since they contain a less toxic mud and are rapidly biodegradable, it being possible for these cuttings to be dumped into the sea as they are or stored on land.

A subject of the present invention is a process for using biodegradable drilling muds, characterized in that a biodegradable surface sludge which is stable up to about 100° C., which has filtrate-reducing power which is adjustable from 2 to 13 cm$^3$ depending on the amount of filtrate-reducing agent used, and which has an electrical stability of greater than or equal to 1000 volts, is introduced into the well at the start of drilling, and in that, when the temperature of the terrain passed through reaches 100° C., the said surface sludge is replaced with a so-called bottom sludge which is stable up to temperatures above 200° C., the volume of the said surface sludge representing from 60 to 80% by volume relative to the total volume of sludge used.

The term "surface sludge" means the mud which can be used from the start of drilling, and the term "bottom sludge" means the mud(s) used in the part of the well in which the specificity of the terrain requires specific chemical and physical resistance properties, such as heat resistance or the neutralization of the acidic species encountered.

In this process according to the invention, in contrast with conventional drilling processes during which only one type of mud is used, several muds, at least two, are used which are adapted to all the series of terrain passed through, for optimization of the cost price of the drilling and of the treatment of the cuttings, and a limitation of the pollution. In this process according to the invention, the first mud, referred to as the surface sludge, is selected so as to be very readily biodegraded. The mud changeover temperature is set at 100° C., in order to give an order of magnitude, but this can be set slightly higher or lower according to the plan of progress of the well casing. However, 100° C. also corresponds to the temperature at which the first mud, or surface sludge, becomes unstable and gradually decomposes over time.

The surface sludge is very rapidly biodegradable and relatively non-polluting to the terrains passed through and to the marine environment. It can be selected from the commercially available water-based muds and biodegradable reverse emulsions, the latter being preferred.

The surface sludge according to the invention consists of a reverse emulsion in which the oil/water ratio by volume ranges from 95/5 to 70/30.

The oil phase consists of a so-called eco-friendly oil, which is of low viscosity and is highly biodegradable in aerobic and anaerobic media. The major advantage of these eco-friendly oils lies in the simplification of the treatment of drilling cuttings impregnated with this oil phase. If these cuttings, or even the eco-friendly oil or the drilling mud itself, are dumped at sea, no pollution results therefrom.

The oil phase contains a majority of unrefined plant or animal natural oils and a minority of a diluent consisting of esters of these natural oils. Since these oils of animal or plant origin are unrefined, they contain 90% by weight, and preferably more than 95% by weight, of triglycerides. They are preferably chosen from the group consisting of sunflower oil, copra oil, soybean oil, rapeseed oil, castor oil, palm oil, palm kernel oil, groundnut oil, linseed oil, olive oil, corn oil, babassu oil, coconut oil and tallow oil.

These oils according to the invention consist of triglycerides corresponding to glycerol triesters of general formula I below:

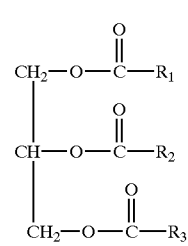

in which $R_1$, $R_2$ and $R_3$, which may be identical or different, are chosen from saturated or unsaturated, linear aliphatic groups $R_i$ consisting of 5 to 23 carbon atoms. These groups derived from aliphatic fatty acids can contain from 1 to 3 olefinic bonds.

Whether the oil is of animal or plant origin, it is the fatty acid residues $R_i$ which give the triglycerides their properties.

In one preferred embodiment of the invention, the fatty acid residues $R_i$ in the triglycerides constituting the oil contain more than 60%, and preferably more than 80%, of saturated or monounsaturated chains $R_1$, $R_2$ or $R_3$.

Among the triglycerides containing fatty acid residues of monounsaturated chains $R_i$, castor oil is preferred.

According to the invention, in the triglycerides of formula (I), the fatty acid residues of chains $R_i$ consist of at least 60% of $R_i$ derived from oleic acid and preferably more than 77% of $R_i$ derived from oleic acid. Oils with a high content of oleic acid, such as, for example, oleic sunflower oil, show excellent resistance to oxidation at high temperatures, which allows the amounts of antioxidants to be reduced, and consequently allows the cost price of the drilling mud to be reduced.

The preferred oleic plant oils are oleic rapeseed oil and oleic sunflower oil.

These plant oils, which are reputed to be relatively unstable for bottom drilling, are sufficiently stable under the conditions in which a surface drilling is carried out, i.e. about 100° C. for a sufficiently short period of time, and without an alkaline reserve promoting the hydrolysis of the triglycerides of which they are composed.

In the oily phase according to the invention, the diluent acts not only to lower the viscosity of the animal or plant oil, but also to improve the lubricant properties and the stability of the resulting emulsion of which the surface sludge is composed.

Since there is little or no possibility of hydrolysis of the ester function under the conditions in which the surface sludge is used, these diluents can be chosen from synthetic esters of linear or branched, saturated or unsaturated aliphatic carboxylic acids comprising from 6 to 24 carbon atoms per chain and of alkanols comprising from 1 to 4 carbon atoms per chain.

These esters are synthesized by esterification, using an alkanol comprising from 1 to 4 carbon atoms per chain, of carboxylic acids obtained by hydrolysis of triglycerides from natural animal or plant oils. It is also possible to synthesize these esters by direct transesterification of the natural triglycerides using an alkanol.

An animal or plant oil or alternatively hydrocarbon-based fractions rich in triglycerides of formula (I), containing more than 60% and preferably more than 80% of saturated or monounsaturated chains $R_1$, $R_2$ or $R_3$, can be chosen as starting material in order to prepare the esters constituting the diluent according to the invention.

In one preferred embodiment of the invention, the synthetic esters constituting the diluent of the invention are formed from plant or animal oils from the group consisting of sunflower oil, copra oil, soybean oil, rapeseed oil, castor oil, palm oil, palm kernel oil, groundnut oil, linseed oil, olive oil, corn oil, babassu oil, coconut oil and tallow oil.

An alkanol chosen from the group consisting of isopropanol, ethanol, propanol, butanol and methanol is preferably used for the esterification.

In one preferred embodiment of the invention, the diluent is synthesized from oils chosen from rapeseed oil, copra oil, sunflower oil and castor oil and from an alcohol, preferably isopropanol.

Bottom sludges chosen from the reverse emulsions obtained with mineral or organic oils which are stable up to 250° C. and above, and non-toxic muds whose cuttings can be returned and stored onshore on account of their low volume, are used in the second part of the drilling. The term "mineral and organic oils" refers to alkylated linear olefins, mono-α-olefins (MAO), poly-α-olefins (PAO), paraffins, esters, acetals and linear alkylbenzenes (LAB).

Another subject of the invention is a surface sludge which is stable up to about 100° C., consisting of from 5 to 30% by volume of water and from 95 to 70% by volume of an oil phase containing a majority of unrefined plant or animal natural oils and a minority of a diluent consisting of esters of these natural oils.

Examples are given below in the present description to illustrate the invention without, however, limiting its scope.

EXAMPLE I

This example is designed to show the lubricant properties of the muds according to the invention when. they are used between 20 and 100° C.

Several samples were prepared containing the compositions as described in Table I below.

TABLE I

| | Composition | | |
|---|---|---|---|
| Sample | Oil | Diluent | Water |
| $E_1$ | oleic sunflower (100%) | 0% | 0% |
| $E_2$ | oleic sunflower (75%) | 2-ethylhexyl acetate (25%) | 0% |
| $X_1$ | oleic sunflower (75%) | isopropyl 2-oleate (25%) | 0% |
| $EMU_1$ | oleic sunflower (67.5%) | isopropyl 2-oleate (22.5%) | 10% |
| $EMU_2$ | oleic sunflower (67.5%) | 2-ethylhexyl acetate (22.5%) | 10% |

These samples were tested on an extreme-pressure Falex machine, derived from the Ford EUBJI 1A method. Each test consists in rotating a cylinder at 290 rpm between two jaws gripping it, and in simultaneously measuring the frictional torque at each plateau of 888 Newtons. The sample is introduced onto the wear axle at a flow rate of 10 ml/mn. Each plateau is maintained for one minute. The value of the plateau before seizing is selected as the lubrication characteristic.

The values measured for each of the samples in Table I are given in Table II below.

TABLE II

| Sample | Seizing plateau (Newtons) | Frictional torque before seizing |
|---|---|---|
| $E_1$ | 7992 | 285 |
| $E_2$ | 6216 | 230 |
| $X_1$ | 6216 | 227 |
| $EMU_1$ | 13,320 (vibration, wear) | 710 |
| $EMU_2$ | 9768 | 475 |

The results obtained with samples $X_1$ and $E_2$ are of the same nature, given the reproducibility of the measurements. Indeed, under the extreme pressure conditions in which the process is performed, it is difficult to differentiate the properties of the two diluents. A reduction in viscosity compared with that of the plant oil itself, corresponding to the effect of the diluent, is mainly observed.

The emulsion $EMU_1$ shows much better lubricant properties than the emulsion $EMU_2$ since, for a strain of 13,320 Newtons, which is the limit of the possibilities of the Falex machine, seizing is still not observed. This result is due to the intrinsic nature of the diluent according to the invention.

Better stability and better lubricant properties are obtained for the emulsion.

EXAMPLE II

This example is designed to describe the rheological properties and filtrate-reducing power of the muds according to the invention before and after ageing, showing that these muds are entirely adaptable to surface drilling between ambient temperature and 100° C.

Three samples of mud $B_1$, $B_2$ and $B_3$ were prepared: their composition is described in Table I below.

TABLE I

| Composition | $B_1$ | $B_2$ | $B_3$ |
|---|---|---|---|
| Base oil | 624 ml (sunflower) | 415.9 ml (sunflower) | 512 ml (oleic sunflower) |
| Diluent | 69.2 ml ($C_8$–$C_{10}$ methyl ester) | 277.2 ml ($C_8$–$C_{10}$ methyl ester) | 170.7 ml ($C_{16}$–$C_{18}$ isopropyl ester) |
| Oil/diluent ratio (vol) | 90/10 | 60/40 | 75/25 |
| Oil/water ratio (vol) | 90/10 | 80/20 | 80/20 |
| Emulsifier | 8.6 ml | 17.2 ml | 25 ml (1) |
| Thickener | 22.3 g (bentone) | 22.3 g (bentone) | 20 g (organophilic hectorite) |
| Wetting agent | 2.9 ml | 2.9 ml | 3 ml |
| Filtrate-reducing agent | 15 g | 15 g | 0 g |
| Water | 73.4 ml | 76.5 ml | 173.7 ml |
| $CaCl_2$ | 28.6 g | 29.8 g | 78.8 g |
| Lime | 2.3 g | 2.3 g | 3 g |
| Baryta | 343.5 g | 294 g | 343.5 g |

The rheological properties of these muds according to the invention, measured with a FANN 35 machine, are given in Table II below before ageing for $B_1$ and $B_3$ (without lime) and after ageing for $B_1$, $B_2$ and $B_3$ (with lime) at 80° C. for 16 hours.

TABLE II

| FANN 35 rpm | B₁ Before | B₁ After | B₂ | B₃ With lime | B₃ Without lime |
|---|---|---|---|---|---|
| 600 | 148 | 158 | 152 | 132 | 151 |
| 3000 | 84 | 95 | 98 | 77 | 95 |
| 200 | 60 | 70 | 77 | 57 | 72 |
| 100 | 36 | 45 | 53 | 36 | 49 |
| 60 | 27 | 34 | 42 | 26 | 39 |
| 30 | 20 | 26 | 33 | 19 | 30 |
| 6 | 13 | 17 | 23 | 12 | 20 |
| 3 | 12 | 16 | 21 | 11 | 18 |
| gel 0 | 12 | 16 | 21 | 15 | 18 |
| gel 10 | 21 | 29 | 23 | 22 | 21 |
| VA (cP) | 74 | 79 | 76 | 66 | 75.5 |
| VP (cP) | 64 | 63 | 54 | 55 | 56 |
| YV | 20 | 32 | 44 | 22 | 39 |
| HP/HT filtrate 80° C. 35 × 10⁵ Pa | 2 ml | 3.2 ml | 4 ml | 10 ml | 13.6 ml |
| electrical stability | >2000 V | >2000 V | >1050 V | >2000 V | >2000 V |

It is found that the plant oil introduced into an appropriate diluent gives a drilling mud of very good stability which shows good heat resistance.

What is claimed is:

1. Process for using biodegradable drilling muds, comprising introducing a biodegradable surface sludge which (1) is stable up to about 100° C., (2) has filtrate-reducing power which is adjustable from 2 to 13 cm³ and (3) has an electrical stability of greater than or equal to 1000 volts, into a well at the start of drilling, and replacing the surface sludge when the temperature of the terrain passed through reaches 100° C. with a bottom sludge which is stable at temperatures above 200° C., such that the volume of the surface sludge represents from 60 to 80% of the total volume of sludge used.

2. Process according to claim 1, wherein the biodegradable surface sludge is chosen from biodegradable water-based muds and reverse emulsions.

3. Process according to claim 2, wherein the surface sludge is a reverse emulsion in which the oil/water ratio by volume ranges from 95/5 to 70/30, the oil phase containing a majority of unrefined plant or animal natural oils and a minority of a diluent consisting of esters of these natural oils.

4. Process according to claim 3, wherein the natural oils contain 90% by weight of triglycerides.

5. Process according to claim 3 wherein the natural oils comprise triglycerides corresponding to glycerol triesters of general formula I below:

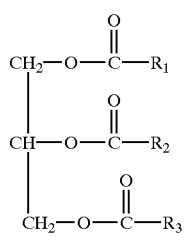

in which fatty acids residues $R_1$, $R_2$ and $R_3$ which may be identical or different, are chosen from linear aliphatic groups which are saturated or which comprise up to three olefinic bonds and consist of 5 to 23 carbon atoms.

6. Process according to claim 5, wherein the fatty acid residues $R_1$, $R_2$ or $R_3$ in the triglycerides of formula (I) contain more than 60% of saturated or monounsaturated chain.

7. Process according to claim 6, wherein the triglycerides of formula (I) whose fatty acid residues $R_1$, $R_2$ or $R_3$ are monounsaturated is castor oil.

8. Process according to claim 6 wherein the fatty acid residues $R_1$, $R_2$ or $R_3$ in the triglycerides of formula (I) contain more than 80% of saturated or monounsaturated chains.

9. Process according to claim 5, wherein, in the triglycerides of formula (I), at least 60% of the fatty acid residues $R_1$, $R_2$ or $R_3$ are derived from oleic acid.

10. Process according to claim 9, wherein, in the triglycerides of formula (I), at least 77% of the fatty acid residues $R_1$, $R_2$ or $R_3$ are derived from oleic acid.

11. Process according to claim 3, wherein the plant oils are selected from the group consisting of oleic rapeseed oil and oleic sunflower oil.

12. Process according to claim 3, wherein the diluent is selected from synthetic esters of linear or branched, saturated or unsaturated aliphatic carboxylic acids comprising from 6 to 24 carbon atoms per chain, and of alkanols comprising from 1 to 4 carbon atoms per chain.

13. Process according to claim 12, wherein the esters are synthesized by esterification, using an alkanol comprising from 1 to 4 carbon atoms per chain, of carboxylic acids obtained by hydrolysis of triglycerides from natural animal or plant oils, or by direct transesterification.

14. Process according to claim 13, wherein the oils chosen as starting material are chosen from animal or plant oils or alternatively from hydrocarbon-based fractions rich in triglycerides corresponding to glycerol triesters of general formula I below:

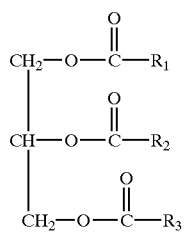

wherein the fatty acid residues $R_1$, $R_2$ or $R_3$ in the triglycerides of formula (I) contain more than 60% of saturated or monounsaturated chains.

15. Process according to claim 14, wherein the fatty acid residues $R_1$, $R_2$ or $R_3$ in the triglycerides of formula (I) contain more than 80% of saturated or monounsaturated chains.

16. Process according to claim 13, wherein the alkanol is chosen from the group consisting of ethanol, propanol, butanol and methanol.

17. Process according to claim 12, wherein the synthetic esters are formed from plant or animal oils selected from the group consisting of sunflower oil, copra oil, soybean oil, rapeseed oil, castor oil, palm oil, palm kernel oil, groundnut oil, linseed oil, olive oil, corn oil, babassu oil, coconut oil and tallow oil.

18. Process according to claim 3, wherein the diluent is synthesized from oils chosen from rapeseed oil, copra oil, sunflower oil and castor oil and from an alcohol.

19. Process according to claim 18, wherein the alcohol is isopropanol.

20. Process according to claim 3, wherein the natural oils contain at least 95% by weight of triglycerides.

21. Process according to claims 4 or 20, wherein the natural oils are selected from the group consisting of sunflower oil, copra oil, soybean oil, rapeseed oil, castor oil, palm oil, palm kernel oil, groundnut oil, linseed oil, olive oil, corn oil, babassu oil, coconut oil and tallow oil.

22. Process according to claim 1, wherein the bottom sludge is chosen from mineral and organic oils which are stable up to 250° C. and above, and non-toxic muds whose cuttings can be returned and stored onshore on account of their low volume.

23. Surface sludge, used in the first step of the process according to claim 1 consisting of from 5 to 30% by volume of water and from 95 to 70% by volume of an oil phase containing a majority of unrefined plant or animal natural oils and a majority of a diluent consisting of esters of these natural oils.

24. Surface sludge according to claim 23, wherein the natural oils contain 90% by weight of triglycerides.

25. Surface sludge according to claim 24, wherein the natural oils consist of triglycerides corresponding to glycerol triesters of general formula I below:

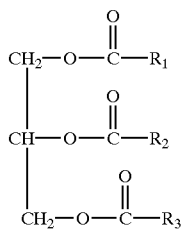

in which $R_1$, $R_2$ and $R_3$ which may be identical of different, are chosen from linear aliphatic groups which are saturated or which comprise up to three olefinic bonds and consist of 5 to 23 carbon atoms.

26. Surface sludge according to claim 23, wherein the natural oils contain at least 95% by weight of triglycerides.

27. Surface sludge according to claim 24 or 26, wherein the natural oils are chosen from the group consisting of sunflower oil, copra oil, soybean oil, rapeseed oil, castor oil, palm oil, palm kernel oil, groundnut oil, linseed oil, olive oil, corn oil, babassu oil, coconut oil and tallow oil.

28. Process for using biodegradable drilling muds, comprising introducing a biodegradable surface sludge which (1) is stable up to about 100° C., (2) has filtrate-reducing power which is adjustable from 2 to 13 $cm^3$ and (3) has an electrical stability of greater than or equal to 1000 volts, into a well at the start of drilling, and replacing the surface sludge when the temperature of the terrain passed through reaches 100° C. with a bottom sludge which is stable at temperatures above 200° C., such that the volume of the surface sludge represents from 60 to 80% of the total volume of sludge used, wherein the surface sludge is a reverse emulsion having an oil/water ratio by volume ranging from 95/5 to 70/30, and an oil phase containing (1) a majority of unrefined plant or animal natural oils comprising 90% by weight of triglycerides, and (2) a minority of a diluent consisting of esters of these natural oils, and the bottom sludge is chosen from the group consisting of mineral and organic oils which are stable at temperatures of 250° C. and above, and non-toxic muds whose cuttings can be returned and stored onshore on account of their low volume.

29. Process according to claim 28, wherein, in the biodegradable surface sludge, the natural oils consist of triglycerides corresponding to glycerol triesters of general formula I below:

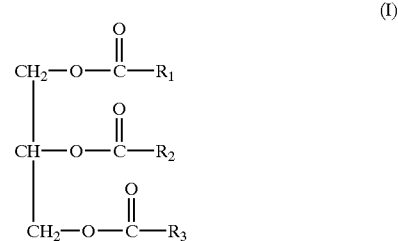

in which $R_1$, $R_2$ and $R_3$ which may be identical or different, are selected from linear aliphatic groups which are saturated or which comprise up to three olefinic bonds and consist of 5 to 23 carbon atoms.

30. Process according to claim 28, wherein the natural oils contain more than 95% by weight of triglycerides.

31. Process according to claim 28 or 30, wherein the natural oils are selected from the group consisting of sunflower oil, copra oil, soybean oil, rapeseed oil, caster oil, palm oil, palm kernel oil, groundnut oil, linseed oil, olive oil, corn oil, babassu oil, coconut oil and tallow oil.

* * * * *

UNITED STATES PATENT AND TRADEMARK OFFICE
CERTIFICATE OF CORRECTION

PATENT NO. : 6,634,442 B1  
DATED : October 21, 2003  
INVENTOR(S) : Josiane Durrieu et al.

It is certified that error appears in the above-identified patent and that said Letters Patent is hereby corrected as shown below:

Title page,
Item [57], ABSTRACT,
Line 2, change "a able" to -- a biodegradable --

Column 9,
Line 33, change "majority" to -- minority --

Signed and Sealed this

Second Day of August, 2005

JON W. DUDAS
*Director of the United States Patent and Trademark Office*